United States Patent [19]
Raley, Jr. et al.

[11] Patent Number: 5,939,009
[45] Date of Patent: Aug. 17, 1999

[54] PROCESS FOR FABRICATING PLASTIC FOAM SHEET MATERIAL WITH COMPOUND RADIUS

[75] Inventors: Robert Lee Raley, Jr., Irving; Marc E. Peterson, Garland, both of Tex.; David A. Lasnier, Laguna Niguel; Bryan J. Tjomsland, Culver City, both of Calif.

[73] Assignee: Advanced Materials, Inc., Rancho Dominguez, Calif.

[21] Appl. No.: 09/128,323

[22] Filed: Aug. 3, 1998

[51] Int. Cl.$^6$ ...................................................... B29C 53/04
[52] U.S. Cl. .......................... 264/310; 264/321; 264/322; 425/384; 425/402
[58] Field of Search .................................... 264/296, 310, 264/321, 322; 425/384, 402

[56] References Cited

U.S. PATENT DOCUMENTS

| | | | |
|---|---|---|---|
| 2,963,744 | 12/1960 | Cooper | 264/296 |
| 3,000,464 | 9/1961 | Watters | 264/321 |
| 3,186,271 | 6/1965 | Kaiser | 264/321 |
| 3,306,967 | 2/1967 | Turkewitsch | 264/321 |
| 3,497,917 | 3/1970 | Negoro | 425/384 |
| 3,684,633 | 8/1972 | Haase | 264/321 |
| 3,846,526 | 11/1974 | Wade | 264/21 |
| 3,948,710 | 4/1976 | Harvey | 156/211 |
| 4,043,729 | 8/1977 | Paracchi | 425/384 |
| 4,060,364 | 11/1977 | Gras | 425/384 |
| 4,078,959 | 3/1978 | Palfey et al. | 264/296 |
| 4,750,961 | 6/1988 | Pflug et al. | 156/212 |
| 4,759,815 | 7/1988 | Frey | 156/222 |
| 4,854,997 | 8/1989 | Shimada | 156/245 |
| 4,986,950 | 1/1991 | Long | 264/310 |
| 5,536,464 | 7/1996 | Muramatsu | 425/384 |
| 5,549,862 | 8/1996 | Vail | 264/238 |
| 5,658,521 | 8/1997 | Morimoto et al. | 264/288.8 |

*Primary Examiner*—Allan R. Kuhns
*Attorney, Agent, or Firm*—Christie, Parker & Hale, LLP

[57] ABSTRACT

A high speed plastic-forming process forms a curved wall section with a compound radius along the outer edge of a sheet of plastic foam material. The process includes first die cutting the flat sheet material to a shape having an initial edge curvature, followed by securing the die cut piece to a carousel which passes the curved outer edge section of sheet material past heaters that controllably heat the top and bottom surfaces of the moving curved edge section. The carousel then passes the pre-heated edge section into contact with an elongated stationary curved forming shoe along the outer edge of the carousel to progressively bend the pre-heated section into a curved wall section of compound radius. The carousel then passes the formed wall section into contact with an elongated stationary curved cooling rail extending around most of the outer edge of the carousel downstream from the forming shoe. The cooling rail holds the sheet material in the curved shape while the temperature is reduced sufficiently to stabilize it in a set configuration. The heating zone length and temperature and the relative lengths of the forming shoe and cooling rail are proportioned to allow continuous feeding of die cut pieces onto the carousel, with finished parts being formed and removed after one revolution of the carousel.

18 Claims, 5 Drawing Sheets

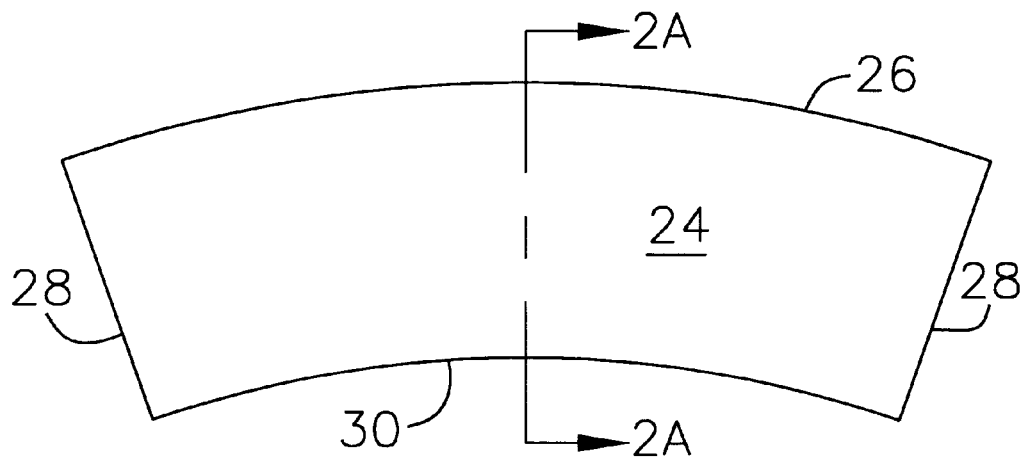
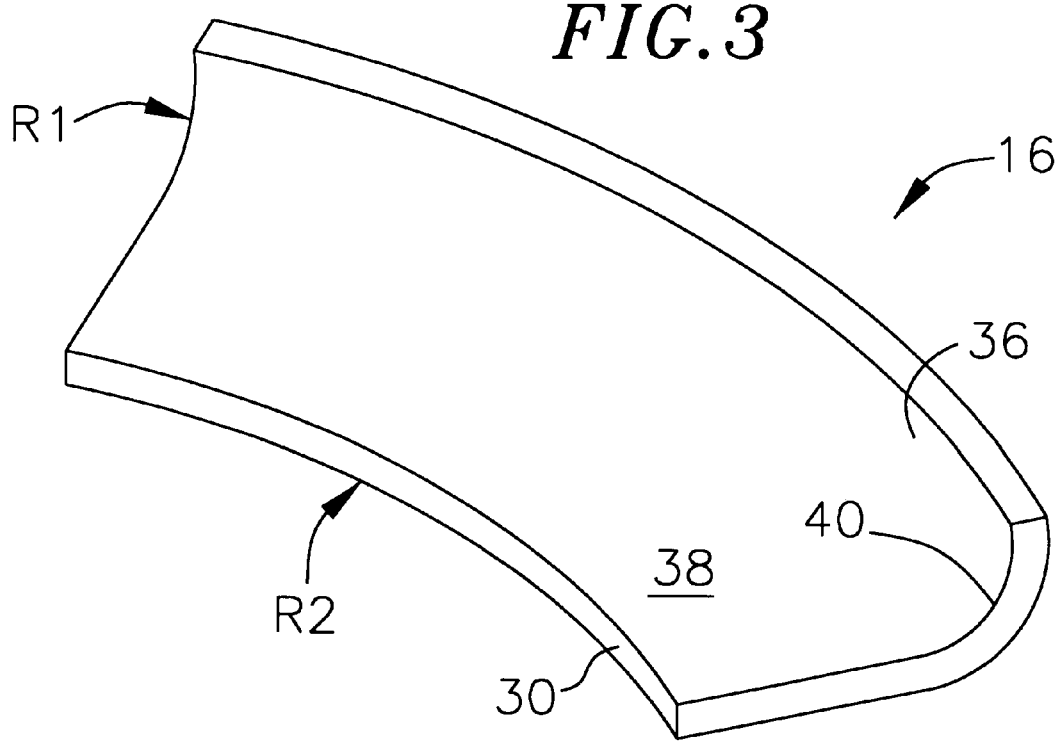

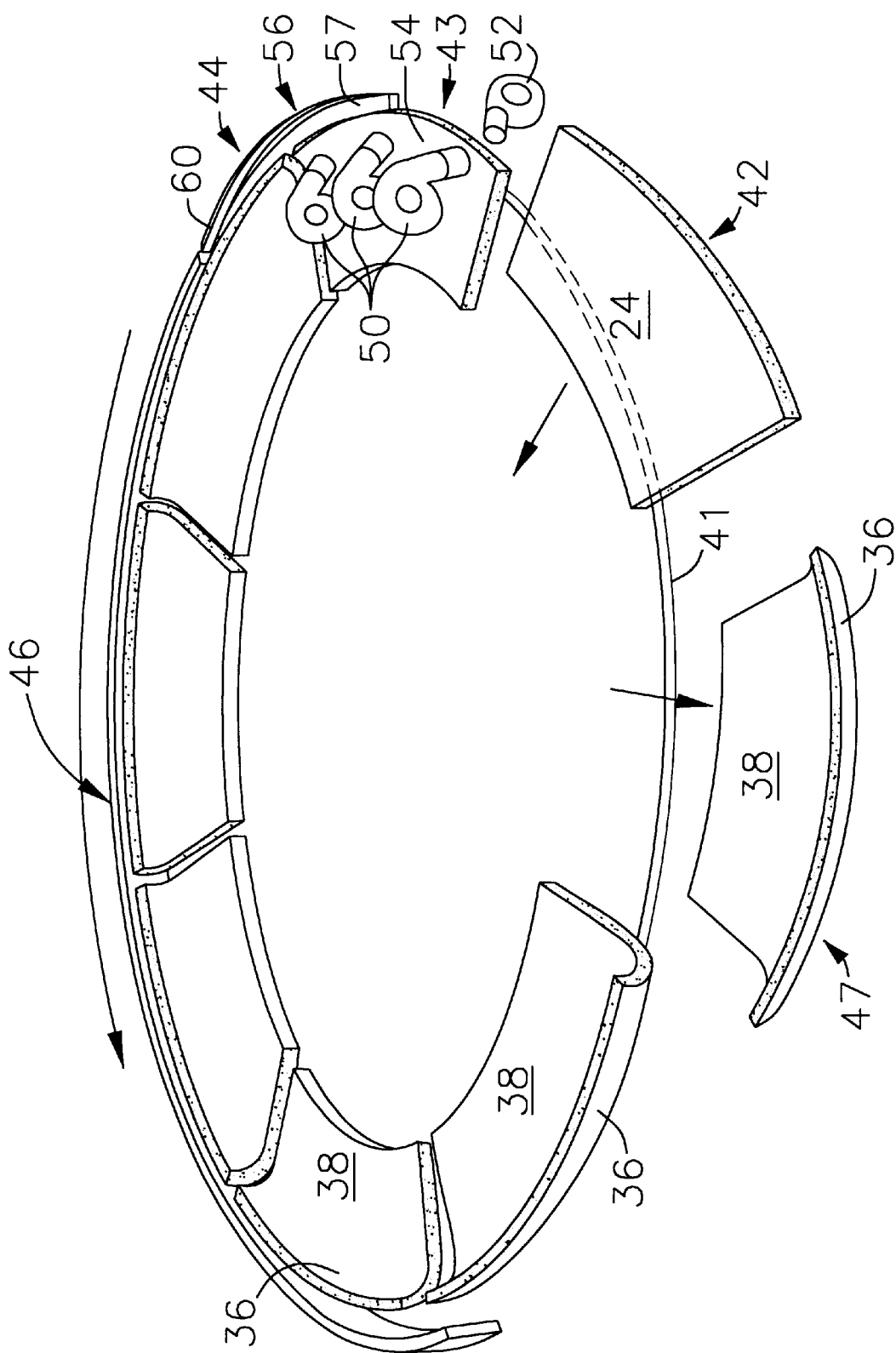

5,939,009

PROCESS FOR FABRICATING PLASTIC FOAM SHEET MATERIAL WITH COMPOUND RADIUS

FIELD OF THE INVENTION

This invention relates to fabrication of plastic sheet material into desired shapes, and more particularly, to a high speed process for forming a curved wall section of compound radius along an outer edge of a flat piece of plastic foam sheet material.

BACKGROUND OF THE INVENTION

Plastic foam sheet material has for years been used in various configurations as padding to absorb impact for providing safety in various types of sports activities. One use of plastic foam sheet material is for frame padding on trampolines. For example, it has been customary to provide safety padding with thick, flat sheets of plastic foam encased in vinyl bags secured around the outer perimeter of the trampoline. Many trampolines in use today are of circular shape in which the frame padding comprises arc shaped segments of flat plastic foam pieces encased in vinyl and held securely in place around the curved outer periphery of the trampoline. The padding for a circular trampoline can be improved by shaping the segments of plastic foam to form curved wall sections along their outer edges, so that each segment has a flat portion which faces upwardly and extends over the suspension spring region of the trampoline, with the curved outer wall section extending over and around the outer frame member of the trampoline.

Marketplace realities are such that the cost of manufacturing the frame padding for a trampoline should not exceed a certain proportion of the total equipment cost. Processing improvements in shaping the plastic foam padding can reduce manufacturing costs. A beneficial result of lower production cost can be the use of more cushioning material in the padding and resultant greater improvements in safety.

Plastic foam padding segments with curved outer wall sections can be made by shaping each piece of material in a clam shell mold. The material can be heated, shaped and cooled in the mold; or it can be heated, molded and then cooled outside the mold. In either instance, tooling costs are high, and substantial amounts of time are taken up between mold cycles, which adds to production costs.

The present invention provides a high speed process for continuous production of improved plastic foam padding material having curved outer wall sections suitable for use as frame padding for trampolines. The continuous process avoids the tooling costs and delay time that occurs between mold cycles in a conventional in-mold process for making foam parts with curved outer wall sections. By improving the speed of production, the cost savings resulting from lower production costs make it possible to use more padding material for the same cost, resulting in greater safety.

Although the invention has been described with reference to plastic foam padding for trampolines, principles of the invention are applicable to other uses of similar padding material as well as a process generally adapted for fabricating plastic foam sheet material with a compound radius.

SUMMARY OF THE INVENTION

Briefly, one form of the invention comprises a process for fabricating plastic foam sheet material with a wall section having a compound radius, comprising the steps of placing a generally flat piece of plastic foam sheet material on a carousel, and positioning (a) a heating zone, (b) a forming zone and (c) a cooling zone in succession along the carousel. The carousel is initially rotated about its axis past the heating zone (a) for heating an outer region of the sheet material to a forming temperature. The pre-heated section of foam material is then rotated by the carousel to the forming zone (b) and into contact with a curved forming shoe for bending the pre-heated section of sheet material into a curved wall section. The pre-formed curved wall section of sheet material is then transferred to the cooling zone (c) where the pre-formed wall section is held in surface contact with a face of a cooling rail positioned downstream from the forming shoe. The cooling rail contact surface has the desired finished curvature of the plastic foam wall section, for maintaining the pre-formed wall section in a fixed position while the temperature of the pre-formed wall section is reduced to a level that stabilizes the wall section in its set curved shape.

In one embodiment, the carousel rotates the formed wall section into surface contact with an elongated curved cooling rail at the outer periphery of the moving carousel downstream from the forming shoe. The rotational rate of the carousel and the length of the cooling rail both control cooling time and produce parts of a stabilized curved shape that can be removed from the carousel prior to completion of one carousel revolution. Thus, die cut flat pieces of foam material can be continuously placed on the moving carousel while previously input pieces are passing in sequence through the heating, forming and cooling zones. The result is a continuous production of formed plastic foam parts with essentially no delay time between forming cycles, resulting in greatly reduced production costs.

The foregoing description relates to one embodiment of the invention with respect to a high speed process for making molded plastic foam parts having a wall section with a compound radius. However, other embodiments of the process and applications for use of the finished product also are possible without departing from the scope of the invention, aspects of which are described in the following detailed description and the accompanying drawings.

BRIEF DESCRIPTION OF THE DRAWINGS

FIG. 2 is a plan view showing a die cut section of a piece of plastic foam in flat form prior to processing according to this invention.

FIG. 2A is a schematic cross-sectional view taken on line 2A—2A of FIG. 2

FIG. 3 is a perspective view showing a finished part made by the process of this invention.

FIG. 4 is a schematic perspective view showing transportation of segments of a plastic foam sheet material past a heating zone, a forming zone and a cooling zone.

DETAILED DESCRIPTION

Figure 1:
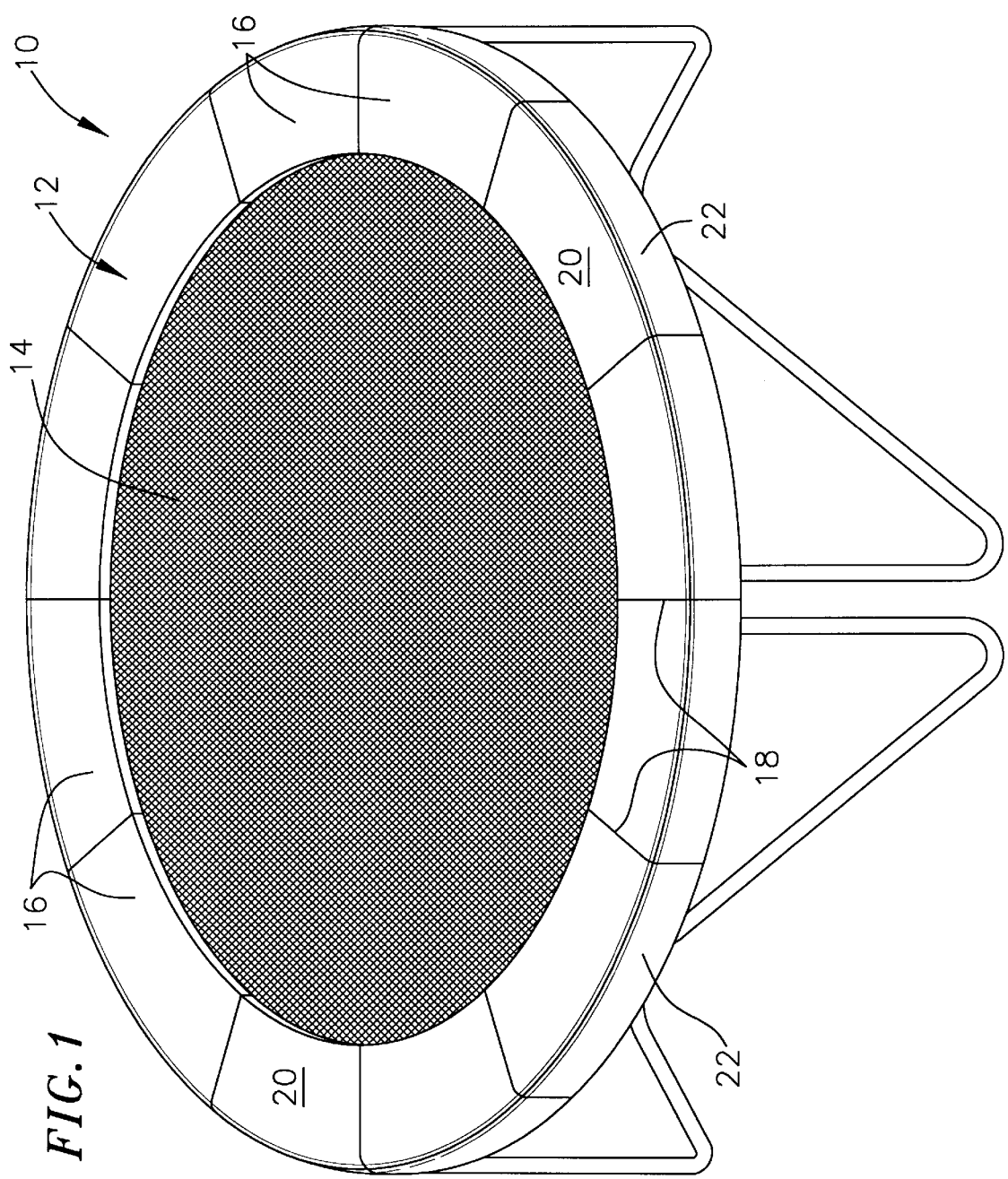
FIG. 1 is a perspective view showing a trampoline having frame padding comprising sections of a fabricated plastic foam material according to principles of this invention.

FIG. 1 is a perspective view illustrating a trampoline 10 having an outer section of plastic foam padding 12 for providing a level of safety for a person jumping on a jumping surface 14 suspended by springs in the conventional manner in the center of the trampoline outer frame. In the illustrated embodiment, the trampoline frame is circular and the padding comprises circumferentially spaced apart arc shaped sections 16 of plastic foam padding secured in a circular configuration around a padded annular outer region of the top surface of the trampoline. The individual sections of padding 16 are preferably of uniform size and shape, and the joints 18 between adjacent sections of padding are aligned along radii that bisect the central axis of the trampoline. The segments of padding can be secured together along their adjacent joints by separate radially extending pressure-sensitive adhesive strips (not shown). Each section of padding has a flat upper surface portion 20 with a downwardly projecting curved wall section 22 extending along its outer edge. The curved wall sections of the padding are curved over and extend downwardly around a circular outer frame member that forms the outside of the trampoline. Thus, the combined sections of foam padding provide impact safety for the circular region that faces upwardly and extends over and around the areas that suspend the jumping surface 14 to the frame.

The present invention provides a process for fabricating plastic foam sheet material into the finished shape of each section 16 of padding material.

FIG. 2 shows the starting material for the process, a die cut piece 24 of plastic foam padding material which is normally in flat sheet form of uniform thickness. According to one embodiment of the invention, the plastic foam sheet material is initially die cut with a circularly curved outer edge 26 and a pair of straight side edges 28 converging inwardly toward a circularly curved inner edge 30. The inner and outer curved edges 26 and 30 of the die cut piece are of different fixed radii concentric with a common axis of rotation. In one embodiment illustrated in FIG. 2A, the die cut piece 24 has a thin outer skin 32 of relatively higher density plastic foam material bonded to the surface of a much thicker plastic foam substrate base 34 having a much lower density. In one embodiment, the starting material comprises a flat sheet of closed-cell polyethylene foam having a base thickness of about 0.68 to about 0.82 inch and a skin thickness of about 0.05 to about 0.07 inch. Dimensions of the starting material can be about 85 to 88 inches for the curved outer edge 26, about 68 to 72 inches for the curved inner edge 30, and about 15 to 17 inches for the straight side edges 28.

Referring to FIG. 3, the process of the present invention shapes the outer region of the flat piece of FIG. 2 into an elongated circularly curved upstanding wall section that forms a curved lip 36 of essentially uniform height along the outer edge of a flat base 38 to form the finished part 16 shown in FIG. 3. The finished part has a compound radius in which a rounded corner 40 formed between the wall section 36 and the flat surface 38 of the plastic foam segment has a uniform circular curvature of shorter radius R1, compared with a longer radius of curvature R2 of the wall section 30. The present invention provides a means for forming this wall section of compound radius along the outer edge of the plastic foam section without creasing the plastic foam material which is manipulated during processing into the finished shape shown in FIG. 3.

Figure 5:
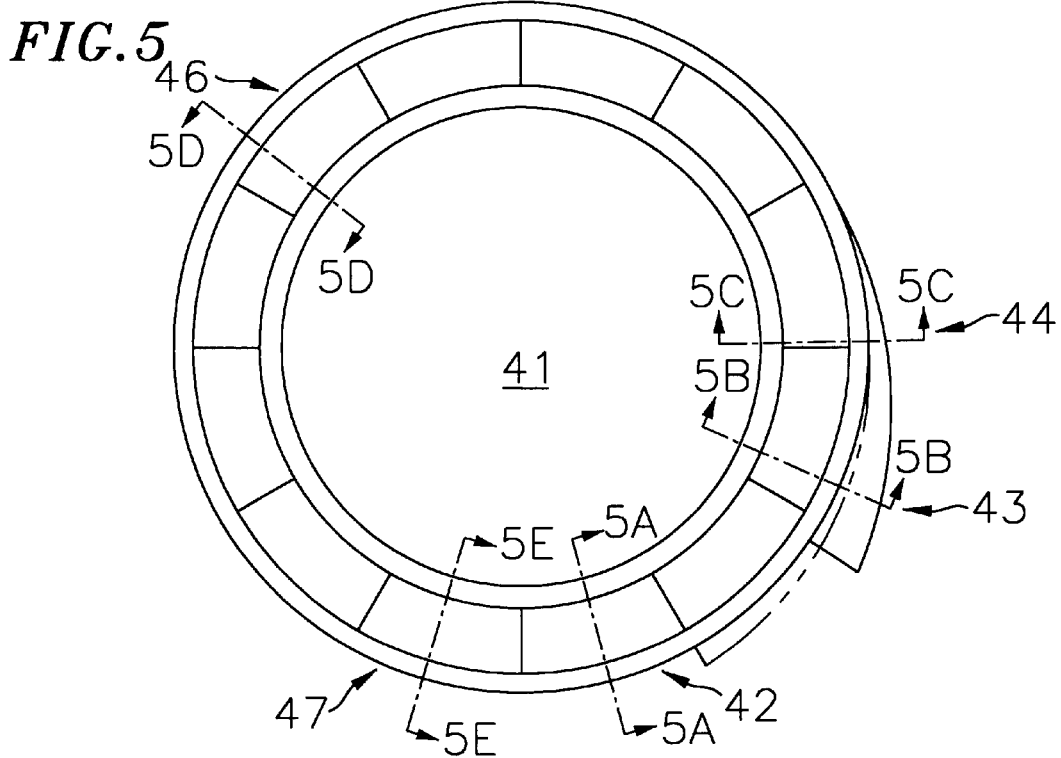
FIG. 5 is a plan view of a carousel showing a plastic foam part passing through regions A through E on the carousel.

FIG. 4 schematically illustrates the steps in a presently preferred process for fabricating the die cut sheets 24 of FIG. 2 into the finished part 16 shown in FIG. 3. The process is carried out using a carousel 41 having a generally flat upwardly facing base of generally circular outer configuration. The carousel base lies in a generally horizontal plane, and the carousel is motor driven about its central axis. Alternatively, a motor drive could be used. During processing, the flat form arcuate sections 24 of die cut plastic foam material are secured in succession to outer portions of the rotating carousel base in a loading zone 42. While held in a stationary position on the rotating carousel, they are rotated past (a) a heating zone 43, (b) a forming zone 44, and (c) a cooling and holding zone 46 spaced apart in succession around the outer periphery of the carousel. FIG. 5 illustrates the relative locations of the loading zone 42, the heating zone 43, the forming zone 44, the cooling and holding zone 46 and an unloading zone 47. In one embodiment the carousel is about 14 feet in diameter and is rotated at a rate of about one revolution per minute. The size of the carousel can vary plus or minus several feet in diameter. Rotation rate can be about 0.5 to 1.0 rpm or more with cooling applied to the formed pieces.

Figure 5A:
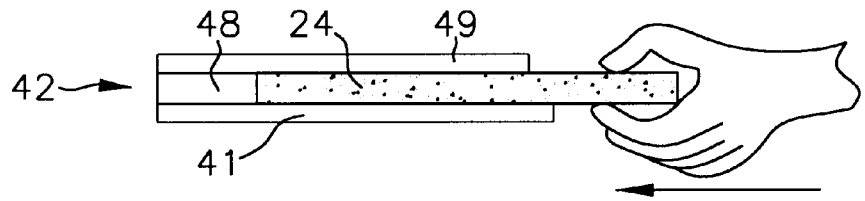
FIGS. 5A through 5E are schematic cross-sectional views taken on lines A—A through E—E of FIG. 5.
Figure 5B:
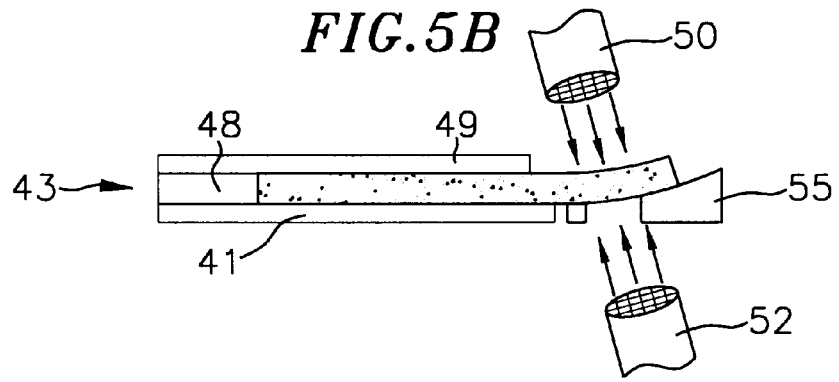
Figure 5C:
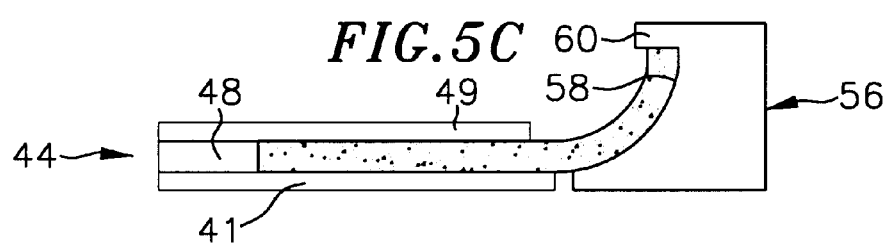

A circular inner guide rail 48 (shown in FIGS. 5A–5E) is located on an upper face of the carousel base 41. The guide rail 48 has a radius of curvature aligned on the rotational axis of the carousel. The inner guide rail provides an upstanding wall surface for contacting the curved inner edge of the die cut pieces to assist in holding them in a fixed position on the rotating carousel. The carousel 41 also has a hold-down device 49 positioned above the upper surface of the carousel for holding the plastic foam pieces in place as the carousel rotates past the heating, forming and cooling zones. FIG. 5A shows the initial die cut piece 24 inserted into the space between the carousel 41 and the hold-down device 49 at the loading zone 42.

The heating zone 43 (shown in cross section in FIG. 5B) comprises an upper group of forced air heaters 50 (shown best in FIG. 4) facing down toward an outer section of the top surface of the plastic foam piece, together with at least one forced air heater 52 facing upwardly toward an outer section of the bottom surface of the plastic foam piece. The plastic foam piece is placed on the carousel so that its higher density outer skin 32 faces downwardly and its thicker lower density substrate base 34 faces upwardly. The heaters apply heat along a curved outer region 54 of the plastic foam piece as the carousel rotates it past the heaters. The area to which heat is applied by the heaters is generally uniform in width and matches the area of curvature of the wall section to be formed. The upper heaters 50 are spaced apart along a curved path to apply generally uniform amounts of heat to the foam material. The space between heaters, the distance of each heater from the plastic foam material subjected to heat, and the amount of heat applied to the foam material are controlled with respect to the rotational rate of the carousel. This controls heating of the plastic material to a sheet temperature within a temperature range sufficient to later shape the heated foam section by bending it into a controlled configuration without burning or otherwise damaging the foam material from excessive heat. An outer support 55 (shown in FIG. 5B) can be used to support the unheated outer edge portion of the plastic foam piece to control the region to which heat is applied.

The rotating carousel next passes the pre-heated plastic foam segment through the forming zone 44, into surface contact with a forming shoe 56 extending along an outer peripheral region of the carousel. The forming shoe 56 comprises an elongated circularly curved fixture 57 having a forming surface 58 (see FIG. 5C) facing inwardly for contacting the pre-heated foam piece as it moves into contact with the forming surface. The forming shoe 56 has a progressively curved inside surface configuration with a shallow curvature along its leading edge that progressively curves into a more upright curvature at its trailing edge. The trailing edge surface configuration of the forming surface matches the desired shape of the wall section on the finished part. As the carousel rotates, the pre-heated outer section of the foam material is moved into contact with the forming surface 58 of the shoe 56; and as it travels lengthwise along the forming shoe (due to rotation of the carousel), it is progressively shaped into the final surface configuration of the wall section (shown in FIG. 5C). The forming shoe also includes an inwardly projecting curved upper lip 60 along its upper edge for acting as an upper restraint to guide the upper edge of the plastic foam piece along its curved path as the heated foam piece is molded into the shape of the wall section.

Figure 5D:
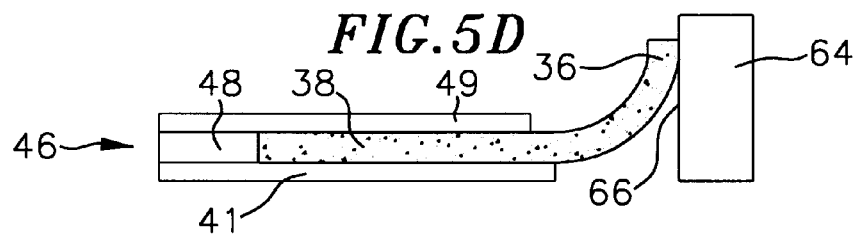
Figure 5E:
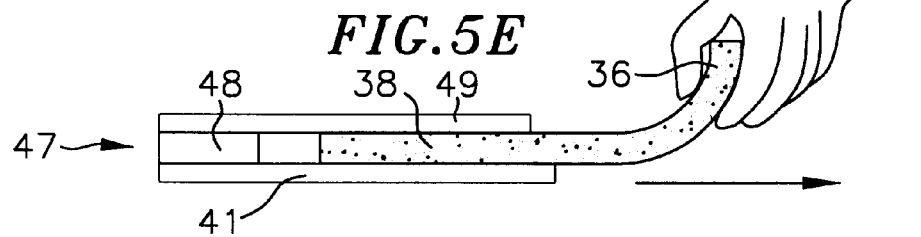

The rotating carousel next passes the shaped plastic foam segment through the cooling and holding zone 46, into surface contact with an elongated curved cooling rail 62 extending along essentially the remaining outer peripheral edge of the carousel. The cooling rail comprises an elongated circularly curved fixture 64 which is generally rectangular in cross section (as shown in FIG. 5D) and has an inwardly facing upright contact surface 66 facing inwardly for contacting the formed plastic foam piece as it travels on the rotating carousel away from the forming zone. The circularly curved lengthwise configuration of the cooling rail matches the circularly curved lengthwise configuration of the foam piece that exits the forming station. (This curvature of the cooling rail also matches the curvature of the outer perimeter of the carousel.) During operation, the circularly curved upright contact surface 66 of the cooling rail maintains pressure on the formed piece as it passes along the contact surface during rotation of the carousel, for maintaining the foam piece in its preset configuration. The cooling rail entrance region is continuous with the exit opening at the end of the forming shoe, and so the formed piece passes continuously from the forming shoe to the cooling rail. The cooling rail extends for over half the remaining distance around the carousel, and a low friction cooling rail surface, preferably provided by a Teflon tape, minimizes friction between the formed piece and the cooling rail. Continued contact with the cooling rail surface dissipates heat to the ambient air and thereby reduces the temperature of the formed piece while holding it in its preshaped configuration. This cooling process is sufficient to set the plastic foam material in its formed shape by the time the plastic foam segment reaches the end of the cooling rail. The finished part is then removed from the carousel at the exit zone 47 as illustrated in FIG. 5E.

Preferably, the plastic foam piece during processing is subjected to a differential heating process in which the lower density material is heated first and bent to a shape, using the higher density skin material to produce a smooth outside bend, then heating the higher density skin material to relieve its tension, while using the now cooling inside material as a form, followed by cooling the entire part while holding it in the desired compound shape.

Liquid or air cooling of the forming shoe is necessary to dissipate residual heat build-up in the shoe caused by surface contact with the heated formed pieces. Cooling of the cooling rail itself also is desirable for maximum productivity (speed of production). Cooling can be accomplished by cast or molded water jackets or with forced air and cooling fins.

Figure 6:
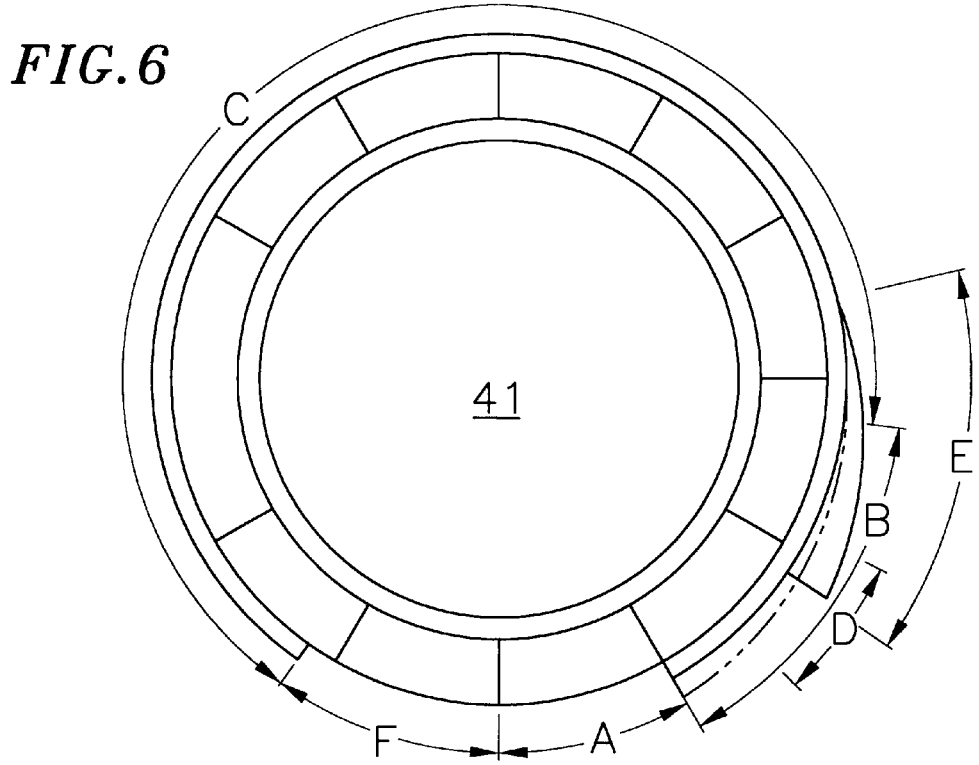
FIG. 6 is a schematic plan view of the carousel illustrating the relative lengths and locations, of a loading zone A, an upper heating zone B, a cooling zone C, a lower heating zone D, a forming zone E, and an exit zone F.

FIG. 6 illustrates the relative length of each zone in the process of the plastic foam piece passing around one revolution of the carousel between the loading zone A and the unloading zone F. This illustration shows the relative lengths of the upper heating zone B, the lower heating zone D, the forming zone E, and the cooling and holding zone C. The loading and unloading zones A and F extend for about 90° of carousel rotation. The upper heating zone B and lower heating zone D extend for about 40° of rotation and 10° of rotation, respectively. The holding and cooling zone C extends for about 230° of carousel rotation. In one embodiment a group of seven forced air heaters were spaced apart across the upper heating zone, and two similar forced air heaters were used in the lower heating zone.

The illustrated example is one embodiment applying principles of this invention. Other embodiments also are possible without departing from the invention. For example, the formed sheet can be moved to a fixed cooling rail for holding it in a fixed position until the shape is stabilized. The invention also can be used on any of a variety of thermoplastic materials that can be heated and formed to a set shape and hardened again to its finished shape. The following example describes one embodiment for carrying out the invention.

EXAMPLE

The following example describes one embodiment for carrying out the invention. A plastic foam sheet similar to that shown in FIG. 2 is formed with the compound curvature of the finished part shown in FIG. 3. The starting material was a closed-cell polyethylene foam in which the base layer had a density of about 1.7 lbs. per cubic ft. and in which the outer skin had a density of about 6.0 lbs. per cubic ft. The base material had a sheet thickness of about 0.75 inch and the outer skin had a thickness of about 0.0625 inch. Dimensions of the starting material (with respect to FIG. 2) were about 87 inches for the curved outer edge, about 71 inches for the inner edge, and about 16 inches for the straight side edges. The heating, forming and cooling zones were similar to those in the illustrated embodiment. The carousel has a diameter of about 14 feet and is rotated at a continuous operating speed of approximately one revolution per minute. The forced air heaters in the heating zone heat the plastic foam material to a sheet temperature of about 205° F. prior to forming. The heating zone heats the material to a sheet temperature in the range of about 195° to about 215° F. The heating zone consists of seven heaters in the upper heating zone and two heaters in the lower heating zone. The heaters were identical, consisting of 750–1000° F. hot air heaters, operating at 9 amps at 220v, from Master Appliance Corp. Measured air temperature at material depth (2"–4") from heater nozzle measured about 300° F. Auxiliary cooling was produced by two floor standing fans. The cooling rail reduces sheet temperature to above about 100° F. to produce finished parts at the unloading zone. Final sheet temperature following cooling and holding can be in the range of about 80° F. to about 120° F. Approximately 12 parts per minute can be produced with a rotating carousel arranged with the heating, forming and cooling zones in the illustrated embodiment.

We claim:

1. A process for fabricating plastic foam sheet material with a wall section having a compound radius, comprising the steps of:

placing a generally flat piece of plastic foam sheet material on a carousel and rotating the carousel so that an exposed section of the sheet material carried by the carousel travels past (a) a heating zone, (b) a forming zone, and (c) a cooling zone along an outer region of the rotating carousel, heating the exposed outer section of the sheet material to a forming temperature in the heating zone (a), thereafter bending the pre-heated section of sheet material into a wall section of a curved shape having a compound radius controlled by rotating the pre-heated section of sheet material into surface contact with a forming shoe in the forming zone (b), the forming shoe having a curved length and a curved face contacting the pre-heated section of sheet material, and thereafter transferring the formed wall section to the cooling zone (c) comprising an elongated cooling rail having a fixed curved surface positioned for surface contact with the formed wall section for holding the wall section in its curved shape while reducing the temperature of the wall section to stabilize it in the curved shape.

2. The process according to claim 1 in which the carousel includes means for holding the sheet material in a fixed position on the carousel.

3. The process according to claim 1 in which the forming shoe is stationary and extends along the periphery of the carousel for a portion of its arc length.

4. The process according to claim 3 in which the cooling rail is stationary and extends along an outer periphery of the carousel for a portion of its arc length downstream from the forming shoe.

5. The process according to claim 1 in which the heating zone comprises heaters directed toward upper and lower outer surface regions of the sheet material.

6. The process according to claim 1 in which the carousel is circular and rotates in a horizontal plane about a fixed axis of the circle.

7. The process according to claim 6 in which the forming shoe is stationary and extends along the periphery of the carousel for a portion of its arc length; and in which the cooling rail is stationary and extends along the outer periphery of the carousel for a portion of its arc length and is located downstream from the forming shoe.

8. The process according to claim 7 in which the die cut piece has a circularly curved outer edge when the sheet is in flat form.

9. The process according to claim 1 in which the cooling rail extends for an arc length substantially longer than the arc length traversed by the forming shoe.

10. The process according to claim 1 in which the plastic foam sheet material passes through the heating, forming and cooling zones in one revolution or less of the carousel.

11. The process according to claim 1 in which the plastic foam sheet material comprises a thermoplastic closed cell plastic foam material.

12. The process according to claim 11 in which the plastic foam sheet material comprises a polyethylene foam.

13. The process according to claim 11 in which the plastic foam material has a skin with a higher density than the foam substrate material to which it is bonded.

14. The process according to claim 1 in which the forming shoe has a progressive curvature extending from a shallow curvature at a leading edge toward an upright configuration at a trailing edge.

15. A process for fabricating plastic foam sheet material with a wall section having a compound radius, comprising the steps of:

placing a generally flat piece of plastic foam sheet material on a generally circularly shaped carousel having an axis of rotation, and positioning (a) a heating zone, (b) a forming zone and (c) a cooling zone in succession along respective arc lengths at the periphery of the carousel;

rotating the carousel about its axis past the heating zone (a) for heating a section of the sheet material to a forming temperature;

thereafter rotating the pre-heated section of sheet material through the forming zone (b) into contact with a curved face of a forming shoe for bending the pre-heated section of sheet material into a wall section of generally circular lengthwise curvature with a curved bend at its base, the sheet material having a remaining portion thereof affixed in flat form to the rotating carousel;

thereafter passing the formed wall section of the sheet material through the cooling zone (c) into surface contact with the face of a cooling rail downstream from the forming shoe for holding the pre-formed wall section in a fixed position during rotation of the carousel along a curved wall section of the cooling rail while lowering the temperature of the formed wall section sufficiently to retain the shaped wall section in its circularly curved shape; and removing the shaped part from the carousel prior to completion of one revolution thereof.

16. A process for fabricating plastic foam sheet material with a wall section having a compound radius defined by a curved bend at its base and a length traversing a curved path, the process comprising the steps of securing a sheet of flexible plastic foam material to a carousel, rotating the carousel past a heating zone at the edge of the carousel for heating an outer region of the sheet material to a forming temperature during rotation of the carousel past the heating zone, thereafter rotating the carousel for moving the pre-heated outer region of the sheet material into surface contact with an elongated forming shoe extending along an arc-shaped path adjacent the outer periphery of the carousel for bending the pre-heated outer region of sheet material into a wall section having a lengthwise curvature and a curvature at its base, both curvatures controlled by contact of the moving heated sheet material with a face of compound curvature on the forming shoe during rotation of the carousel past the forming shoe, and thereafter moving the pre-formed wall section of sheet material into surface contact with an elongated curved cooling rail for holding the formed wall section in a fixed configuration through a temperature reduction to stabilize the formed wall section in a finished shape defining said compound curvature.

17. The process according to claim 16 in which the shaped part is removed from the carousel in its finished shape of compound curvature prior to completion of one carousel revolution.

18. The process according to claim 16 in which the plastic foam material is a closed cell thermoplastic material.

* * * * *